United States Patent
Hille

(10) Patent No.: US 10,975,268 B2
(45) Date of Patent: Apr. 13, 2021

(54) SEALING SHEET AND ADHESIVE TAPE FOR WET ROOMS

(71) Applicant: HYDROPHON KUNSTSTOFFTECHNIK GMBH, Kirchhundem (DE)

(72) Inventor: Thomas Hille, Kirchhundem (DE)

(73) Assignee: HYDROPHON KUNSTSTOFFTECHNIK GMBH, Kirchhundem (DE)

( * ) Notice: Subject to any disclaimer, the term of this patent is extended or adjusted under 35 U.S.C. 154(b) by 0 days.

(21) Appl. No.: 15/546,961

(22) PCT Filed: Jan. 15, 2016

(86) PCT No.: PCT/EP2016/050710
§ 371 (c)(1),
(2) Date: Jul. 27, 2017

(87) PCT Pub. No.: WO2016/128170
PCT Pub. Date: Aug. 18, 2016

(65) Prior Publication Data
US 2018/0002574 A1    Jan. 4, 2018

Related U.S. Application Data

(60) Provisional application No. 62/131,656, filed on Mar. 11, 2015.

(30) Foreign Application Priority Data

Feb. 10, 2015 (DE) .................. 10 2015 101 841.1
Mar. 9, 2015 (DE) .................. 10 2015 103 424.7

(51) Int. Cl.
*B32B 5/18* (2006.01)
*B32B 5/24* (2006.01)
(Continued)

(52) U.S. Cl.
CPC .................. *C09J 7/26* (2018.01); *A47K 3/008* (2013.01); *B32B 5/022* (2013.01); *B32B 5/18* (2013.01);
(Continued)

(58) Field of Classification Search
CPC ...... C09J 7/26; C09J 7/00; B32B 5/00; B32B 7/00; E04F 13/00; E04B 1/00; Y10T 442/00
See application file for complete search history.

(56) References Cited

U.S. PATENT DOCUMENTS 3,511,808 A    5/1970  Hodge et al.
4,397,906 A *  8/1983  Nakagawa ............... C08J 5/124
                                              428/195.1
(Continued)

FOREIGN PATENT DOCUMENTS

DE    1 937 934 A    2/1970
DE    19 37 394 A    2/1971
(Continued)

OTHER PUBLICATIONS

Machine Translation of (DE 10 2011 054 523) (Year: 2011).*
(Continued)

*Primary Examiner* — Lucas A Stelling
*Assistant Examiner* — Sathavaram I Reddy
(74) *Attorney, Agent, or Firm* — Henry M. Feiereisen LLC

(57) ABSTRACT

A sealing for arrangement between a wall and a wall covering includes a sealing sheet and an adhesive tape. The sealing sheet and the adhesive tape each have a carrier layer of a preferably closed-cell foam plastic. Furthermore, the sealing sheet can bear a nonwoven fabric preferably on the wall-facing side, wherein border strips remain free of the nonwoven fabric for underlapping with an adhesive tape.

20 Claims, 5 Drawing Sheets

(51) Int. Cl.
*E04B 1/66* (2006.01)
*B32B 5/02* (2006.01)
*B32B 7/14* (2006.01)
*C09J 7/26* (2018.01)
*E04F 15/18* (2006.01)
*E04F 13/08* (2006.01)
*B32B 5/22* (2006.01)
*E04F 15/02* (2006.01)
*A47K 3/00* (2006.01)
*C09J 123/22* (2006.01)
*C09J 157/06* (2006.01)

(52) U.S. Cl.
CPC ............... *B32B 5/22* (2013.01); *B32B 5/245* (2013.01); *B32B 7/14* (2013.01); *E04B 1/665* (2013.01); *E04F 13/0887* (2013.01); *E04F 15/02155* (2013.01); *E04F 15/182* (2013.01); *B32B 2266/025* (2013.01); *B32B 2266/0207* (2013.01); *B32B 2266/0242* (2013.01); *B32B 2266/0278* (2013.01); *B32B 2266/08* (2013.01); *B32B 2266/14* (2016.11); *B32B 2307/7246* (2013.01); *B32B 2307/7265* (2013.01); *B32B 2405/00* (2013.01); *B32B 2419/00* (2013.01); *B32B 2581/00* (2013.01); *B32B 2607/00* (2013.01); *C09J 123/22* (2013.01); *C09J 157/06* (2013.01); *C09J 2301/312* (2020.08); *C09J 2400/243* (2013.01); *C09J 2409/006* (2013.01); *C09J 2421/006* (2013.01); *C09J 2423/00* (2013.01); *C09J 2423/006* (2013.01); *C09J 2423/046* (2013.01); *C09J 2423/106* (2013.01); *C09J 2433/00* (2013.01); *C09J 2433/006* (2013.01); *C09J 2475/006* (2013.01); *C09J 2483/006* (2013.01)

(56) References Cited

U.S. PATENT DOCUMENTS

| | | | |
|---|---|---|---|
| 5,268,228 A | 12/1993 | Orr | |
| 6,537,934 B1 * | 3/2003 | Yeo | B32B 5/18 442/149 |
| 8,468,767 B1 * | 6/2013 | McBride | E04B 1/40 52/461 |
| 2018/0044827 A1 * | 2/2018 | de Weerd | B29B 15/12 |

FOREIGN PATENT DOCUMENTS

| | | | | |
|---|---|---|---|---|
| DE | 4326671 A1 * | 2/1995 | | C09K 3/10 |
| DE | 2007 010 997 A1 | 9/2008 | | |
| DE | 2011 054 523 A1 | 4/2013 | | |
| DE | 2011 107 186 U1 | 4/2013 | | |
| EP | 1 967 107 B1 | 7/2011 | | |
| EP | 2 604 160 A1 | 6/2013 | | |
| JP | H09-227843 A * | 9/1997 | | C09J 7/02 |
| WO | WO 2014/100921 A1 | 7/2014 | | |

OTHER PUBLICATIONS

Bausch, Machine translation for DE 4326671—Abstract, Feb. 16, 1995. (Year: 1995).*

Bausch, Machine translation for DE 4326671—Description, Feb. 16, 1995. (Year: 1995).*

Machine Translation of JP H09-227843A (Year: 1997).*

English International Search Report issued by the European Patent Office in International Application PCT/EP2016/050710 dated May 6, 2016.

* cited by examiner

SEALING SHEET AND ADHESIVE TAPE FOR WET ROOMS

CROSS-REFERENCES TO RELATED APPLICATIONS

This application is the U.S. National Stage of International Application No. PCT/EP2016/050710, filed Jan. 15, 2016, which designated the United States and has been published as international Publication No. WO 201 6/1 281 70 and which claims the priority of German Patent Application, Serial No. 10 2015 101 841.1, filed Feb. 10, 2015, German Patent Application, Serial No. 10 2015 103 424.7 filed Mar. 9, 2015, pursuant to 35 U.S.C. 119(a)-(d), and U.S. provisional Application No. 62/131,656 filed Mar. 11, 2015 pursuant to 35 U.S.C. 119(e).

BACKGROUND OF THE INVENTION

The invention relates to a sealing sheet, an adhesive tape and a sealing kit made thereof for arrangement between a wall and a wall covering, in particular in a wet cell.

From DE 10 2011 054 523 A1 a sealing kit for a wet cell is known which can be processed "dry" in that sealing sheets are glued overlappingly onto the wall by means of an adhesive layer applied to the wall.

In light of the foregoing it is an object of the present invention to provide an alternative sealing for rooms such as for example in wet rooms.

SUMMARY OF THE INVENTION

This object is solved by a sealing set according to claim 1, by a sealing sheet according to claim 2, by an adhesive tape according to claim 6 and by a wall connection according to claim 12. Advantageous embodiments are set forth in the dependent claims.

A sealing kit according to the invention according to claim 1 includes a sealing sheet and an adhesive tape which are explained in more detail below.

According to one aspect the invention thus relates to a sealing sheet for arrangement between a wall and a wall layer, for example a tile cover. As the term "sheet" indicates the sealing sheet is a flat, strip-shaped and flexible product with a defined width of typically several decimeters and a small thickness of typically several millimeters or less. In the unprocessed state the sealing sheet is wound up preferably in longitudinal direction so that required lengths of the sealing sheet (for example corresponding to the room height) can be separated as needed. In addition the term "wall" in the present context and in the following is understood broadly as any surface for example also in the form of a floor or ceiling of a room. The sealing sheet includes the following components:

a) a support layer made of plastic foam. The support layer typically extends over the entire surface area of the sealing sheet. The support layer is preferably gas and/or water impermeable so that a vapor barrier is formed.

b) an adhesion mediating structure arranged on a side of the support layer. In the following the side of the support layer that carries this structure is referred to as "room-facing side" because during processing it usually faces the room. The adhesion mediating structure can in particular be configured so as to mediate good adhesion of a tile adhesive. The adhesion mediating structure can for example be formed by a non-woven material (for example a spun-bonded fabric made of synthetic fibers).

In a preferred embodiment the sealing sheet has an adhesion-mediating structure (for example the same structure as on the room facing side) also on its wall-facing side. This makes it possible to process the sealing sheet "wet" i.e. for example to embed it in a tile glue or other construction chemical that has been applied on the wall.

In a refinement of the embodiment described above at least one wall-side border strip (which extends in longitudinal direction) of the sealing sheet is free of the adhesion mediating structure. Preferably the two opposing border strips of the sealing sheet are free of the adhesion mediating structure. In particular the support layer can be exposed in the border strips. The width of the border strips can typically be between about 20 mm and 100 mm. The provision of the border strips enables a "dry connection" in which for example the support layer is glued to the wall with an adhesive strip.

In another preferred embodiment the sealing sheet can carry an adhesive layer on the wall side, with which adhesive layer the sealing sheet can be glued onto the wall or another underground. The adhesive layer optionally extends over the full surface area of the entire wall-facing side of the support layer, so that the sealing sheet can be glued over its entire surface onto the wall in a "dry" processing.

According to another refinement of the embodiment above the adhesive layer is limited to one border strip (which extends in longitudinal direction) of the sealing sheet, so that the sealing sheet can for example be glued to an adhesive strip that is already present on the wall. In particular this embodiment can be combined with the feature that the sealing sheet has an adhesive mediating structure (between the border strips) on the wall-facing side.

According to a further aspect the invention also relates to an adhesive strip for arrangement between a wall and a wall covering, which includes the following components:

a) a support layer made of a foamed plastic. The support layer can be constructed similar as in the case of the sealing sheet, i.e., for example water impermeable.

b) an adhesive layer arranged on the wall-facing side of the support layer.

The adhesive layer is, similar to the sealing sheet, strip shaped or band shaped. While the sealing sheet typically has a width of between about 30 cm to about 100 cm, the adhesive strip is usually narrower, having a width in the range of about 4 cm to about 20 cm.

The sealing sheet and the adhesive strip have as characterizing feature a support layer made of foamed plastic. Such a foamed plastic has the advantage that its foam cells can compensate sharp-edged, pointed undergrounds and the sealing effect is retained. In addition a support layer made of foamed plastic has a higher stiffness than for example a film, which in many cases is beneficial for processibility. Thus the sealing sheet or the adhesive strip can be applied well and without bubble formation on an underground, and during packaging of objects (for example shower drains) that are provided by the manufacturer with the sealing sheet or the adhesive strip no lasting bends are created in the material.

The adhesive strip can optionally be further refined so that an adhesive layer is also present on the room-facing side of the adhesive strip. To this adhesive layer then for example a wall-side (non-woven-free) border strip of a sealing sheet of the above described type can then be glued.

The foamed plastic, which forms the support layer of the sealing sheet and/or the adhesive strip, is preferably a closed cell plastic. Such a closed cell foamed plastic is water impermeable or has a negligible water uptake and a high water vapor diffusion resistance.

In addition the foamed plastic can optionally be made for example of materials such as a polyolefin, polyethylene, polypropylene, polyurethane, silicone, cellular rubber, acrylic foam and/or butyl. The gas enclosed in the foam is typically air.

In addition or as an alternative the foamed plastic can be crosslinked, in particular physically crosslinked. In the crosslinking the polymer chains of the material are chemically bonded to each other at defined points and form a three-dimensional network. The physical crosslinking is hereby for example accomplished by a high-energy electron beam. The physical crosslinking allows producing particularly thin foamed plastic layers. In addition a physically cross linked foamed plastic can be recognized in that it typically has a closed surface ("foam skin").

The elongation at break is an important parameter for selecting an appropriate foamed plastic. The elongation at break A is defined as the permanent length change $\Delta L = (L_u - L_0)$ of a probe in relation to the starting length after rupture ($L_u$=length after the rupture) according to the formula $$A = \Delta L/L_0 * 100\%.$$

In this regard it is advantageous when the foamed plastic, which forms the support layer of the sealing sheet and/or the adhesive strip, has an elongation at break of over 300%, preferably over 400%.

The thickness of the support layer of the sealing sheet and/or the adhesive strip is preferably less than about 5 mm, less than about 1 mm or less than about 0.2 mm. Typically the thickness is between about 0.5 mm and 5 mm, particularly preferably between about 0.2 mm and 1.0 mm.

The adhesive layer which is present on the adhesive strip and (optionally) on the sealing sheet can in particular be made of or contain butyl, synthetic rubber, a cross linked or un-cross linked acrylate, and/or an adhesive dispersion. In addition or as an alternative the thickness of the adhesive layer can be about 0.05 mm to about 2.0 mm, preferably about 0.10 mm to about 0.3 mm.

In addition prior to their processing the adhesive layers are preferably covered by a removable protective film. The protective film can be divided in sheet direction or longitudinal direction and/or transverse thereto into two or more strips which can be removed (separate from each other (after each other) from the adhesive layer.

According to another embodiment of the invention the adhesive strip is shaped three dimensionally as an inner corner or as an outer corner. Due to the wall-side adhesive layer a thusly pre-shaped inner corner or outer corner can be well applied in a corresponding inner corner or outer corner of a room where it can ensure an absolute sealing in the critical abutment point of multiple sealing sheets.

The above-mentioned inner corners or outer corners are preferably produced in the deep drawing process. Hereby an initial plan sheet of the foamed plastic material is preferably first heated, then slightly pre-stretched and subsequently drawn onto a tool shape using a vacuum. During the production of the inner corners the used tool form is for example the tip of a (square or triangular) pyramid.

In addition the inner corners and/or outer corners are preferably essentially made of the support layer that is made of foamed plastic (i.e. they are free of an adhesion mediating layer and an adhesive layer; only at the borders an adhesive may optionally be arranged as fixing aid during mounting).

The sealing set according to the invention can include a sealing sheet and an adhesive strip according to a respective one of the above described embodiments. The adhesive strip can hereby be used to seal abutments between neighboring sealing sheets and of space edges and the like wherein the adhesive strip is glued overlapping with the sealing sheet.

In another optional configuration of the invention the sealing sheet or the adhesive strip is configured as a sleeve for a shower drain line or the like and carries on the room-facing side an adhesion-mediating structure such as for example a non-woven material. The configuration as a sleeve usually means that the sealing sheet or the adhesive strip has the shape of a rectangular frame wherein the free inner end of the frame comes to lie over the indentation of a shower drain line and the frame edges typically are glued on the flanges of the shower drain line and on the underground (floor).

Preferably in the embodiment described above at least one border strip of the sealing sheet or the adhesive strip is free of the adhesion mediating structure. Typically the border strip is a border strip at a longitudinal border. Optionally opposing border strips and in particular preferably all border strips are free of the structure. On the free border strips a sealing sheet and/or an adhesive strip and/or another sealant (for example a grout strip with capillary stop according to EP 1 967 107 B1) can be glued.

According to a further aspect the invention relates to a watertight wall sealing which includes the following components:

a wall, for example a brick wall, a floor, a ceiling or a wall made of wood.

optionally an adhesive strip with a support layer made of a foamed plastic and an adhesive layer arranged under the support layer.

a sealing sheet with a support layer made of a foamed plastic and an adhesion mediating structure such as a non-woven material, arranged on a room-facing side of the support layer.

a wall cover arranged on the adhesion mediating structure of the sealing sheet by means of a tile adhesive or the like.

Typically the mentioned components are arranged in layers in the stated order, wherein the adhesive layer however only extends in the region of the abutments between neighboring sealing sheets.

The invention also relates to the use of a sealing sheet and/or an adhesive layer according to one of the above-described embodiments for producing a wall covering, in particular a wall covering of the aforementioned type.

BRIEF DESCRIPTION OF THE DRAWING

In the following the invention is explained exemplarily in more detail by way of the Figures. Hereby it is shown in.

DETAILED DESCRIPTION OF PREFERRED EMBODIMENTS

Figure 1:
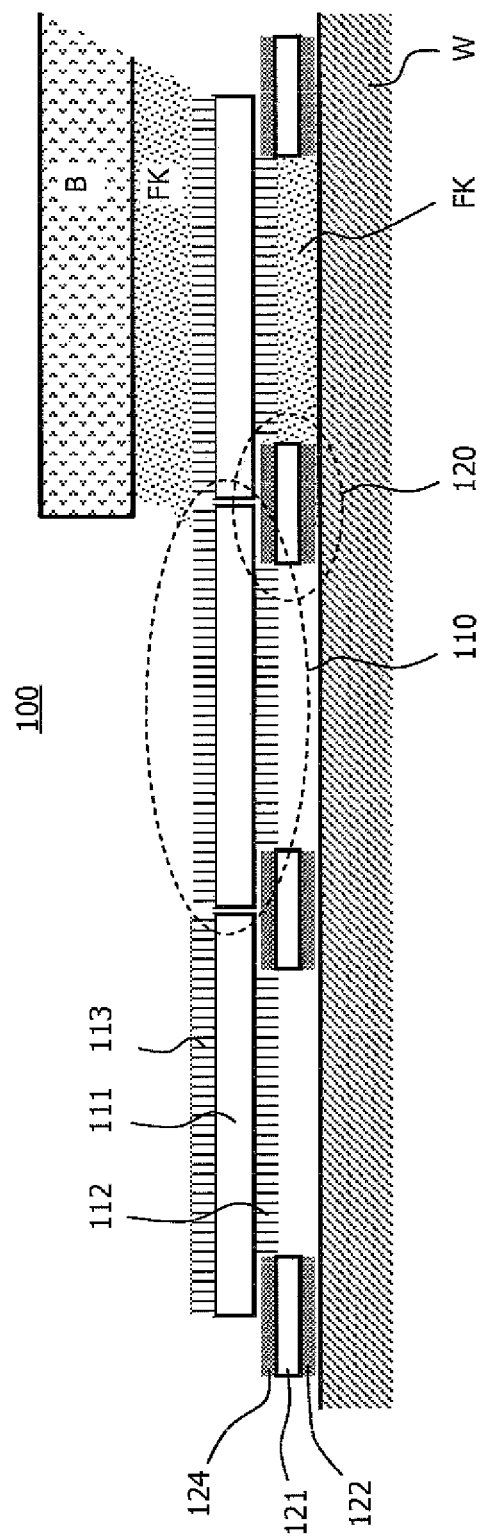
FIG. 1 a schematic cross section through a wall covering with a sealing set according to a first embodiment of the invention, in which both sides of the adhesive strip are configured self-adhesive and the sealing sheet caries a non-woven material on its wall-facing side.

FIG. 1 shows a schematic cross section of a wall construction, which is produced with a sealing kit 100 according to a first embodiment of the invention. The sealing kit is hereby arranged between the wall W and a wall covering B (for example tiles). It includes two basic components, i.e., (see FIGS. 2 and 3):

sealing sheets 110, which include a support layer 111 made of a closed-cell foamed plastic and are provided on their room-facing side (in FIG. 1 top) with a non-woven 113 as adhesion mediating structure. In the shown embodiment furthermore an adhesion mediating structure in the form of a non-woven 112 is present on the wall-facing side of the support layer 111, which non-woven 112 however only extends in a middle region. The neighboring border strips remain free of non-woven typically on a width of 20 to 100 mm so that no glue can adhere at this location.

adhesive strips 120, which also include a support layer 121 made of a closed-cell foamed plastic (for example identical to the foamed plastic 111 of the sealing sheet 110), and are provided on their wall-facing side with an adhesive layer 122. The adhesive layer 122 is hereby covered prior to processing (see FIG. 3) by a removable protective film, which is preferably divided into two strips 123a and 123b in longitudinal direction. In the shown exemplary embodiment the adhesive strips 120 are also provided on their room-facing side with an adhesive layer 124, wherein this adhesive layer is also optionally protected by two removable films 124a and 124b.

The wall is constructed so that first (after removing the protective films 123a, 123b) the adhesive strips 120 are glued at an appropriate distance (determined by the width of the non-woven 112 on the sealing sheets) onto the wall (or the floor). Then the interspace between the adhesive strips is filled with tile glue FK or other construction chemistry. In the next step a sealing sheet 110 is glued dry on the right hand and left hand side on adhesive strips (underlap) and is centrally embedded in the tile glue FK or the construction chemistry. Finally the wall covering B (for example tiles) is applied onto the non-woven 113 of the sealing sheets by means of a tile glue FK.

Figure 2:
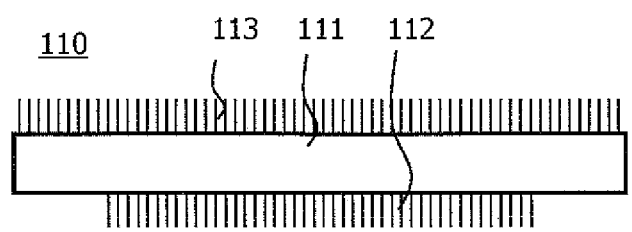
FIG. 2 separately the sealing sheet of the sealing kit of FIG. 1.
Figure 3:
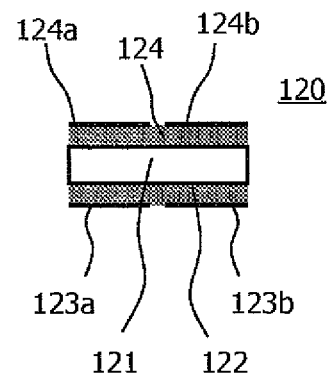
FIG. 3 separately the sealing strip of the sealing kit of FIG. 1 with removable films.
Figure 4:
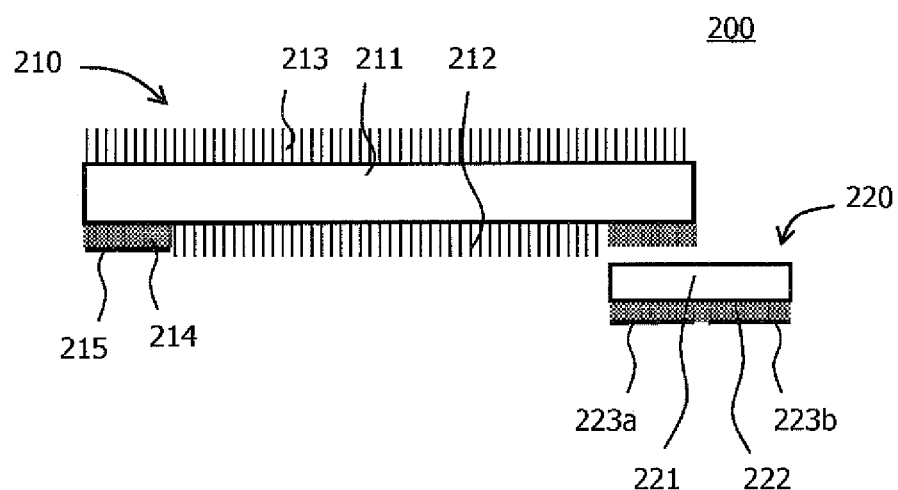
FIG. 4 a schematic cross section through a wall covering with a sealing kit according to a second embodiment of the invention, in which the border strips of the sealing sheet are provided with an adhesive layer.

FIG. 4 shows an alternative embodiment of a sealing kit 200, wherein same or similar components are provided with reference numerals that are incremented by 100. The sealing kit 200 includes the sealing sheets 210, the support layer 211, the non-wovens 212 and 213, the adhesive layer 214, the removable film 215, the adhesive strips 220, the support layer 221, the adhesive layer 222, and the removable protective film divided into two strips 223a and 223b. The difference with respect to the sealing kit 100 of FIGS. 1 to 3 is that the adhesive layer 214 which connects the adhesive strips 220 and sealing sheets 210 with each other, is now arranged by the manufacturer on the border strips on the wall-facing side of the sealing sheets 210, while the room-facing side of the adhesive strips 220 remains free of adhesive (prior to processing).

Figure 5:
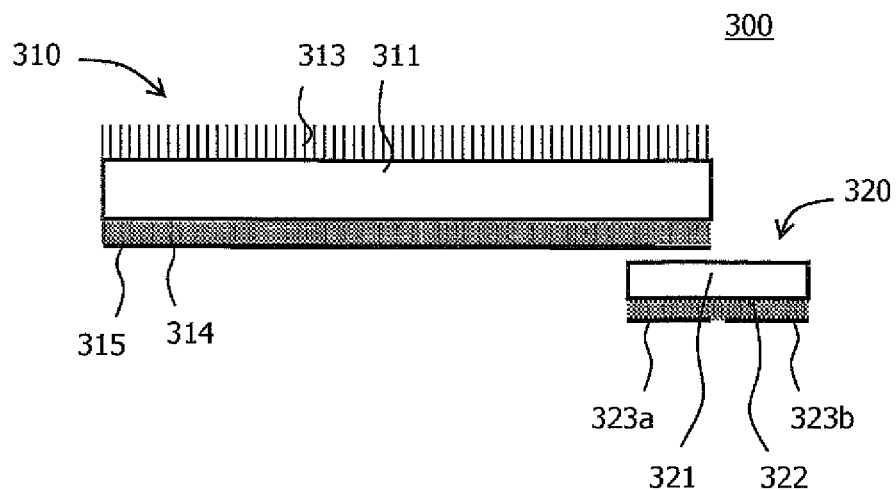
FIG. 5 a schematic cross section through a wall covering with a sealing kit according to a third embodiment of the invention in which the sealing sheets are provided on the entire surface of their wall-facing side with an adhesive layer.

FIG. 5 shows a further alternative embodiment of a sealing kit 300, wherein the components that are the same or similar to those in FIG. 1 are provided with reference numerals that are incremented by 200. The sealing kit 300 includes the sealing sheets 310, the support layer 311, the adhesive layer 314, the removable film 315, the adhesive strips 320, the support layer 321, the adhesive layer 322, and the removable protective film divided into two strips 323a and 323b. The difference with respect to the sealing kit 100 of FIGS. 1 to 3 is that the sealing sheet 310 is provided with the adhesive layer 314 on the entire surface of the wall-facing side, which adhesive layer 314 is protected prior to processing by the removable film 315. Such a sealing sheet 310 can thus be installed dry. The adhesive strip 320 is essentially identical to the adhesive strip 220 of FIG. 4.

The support layers 111, 121, 211, 221, 311 and 321 in the described sealing sheets and adhesive strips can in particular be made of a physically crosslinked plastic, for example a polyolefin foam. The thickness of the support layers can preferably be between about 0.3 mm and about 0.6 mm. The elongation at break of the support layers is preferably over 300%, for example about 450%. Due to the foam structure of the support layer 311 the support layer can come into particularly close contact with a wall surface, which results in good grip. At the same time the support layer made of foamed plastic has a certain stiffness which makes processing easier (avoidance of folds, kinks, air bubbles etc.).

When adhesive layers are protected with removable film the removable film can be removed longitudinally or transversely in steps, wherein a special grid of separating lines through the removable film ensures a clean self-defined separation.

Figure 6:
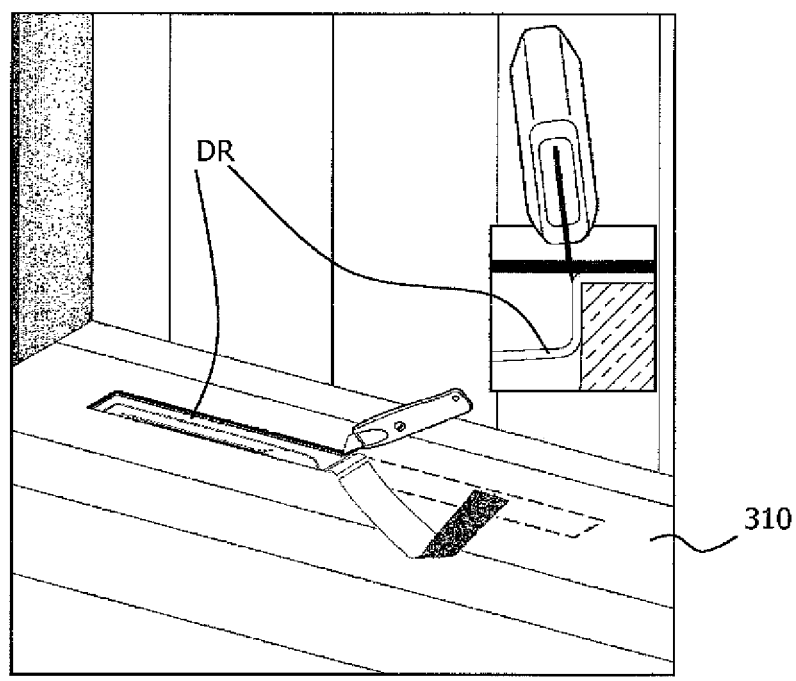
FIG. 6 the arrangement of a sealing sheet above a shower drain line.

FIG. 6 shows as an example for a line drainage the integration of a shower drain line DR in a sealing sheet 310 installed on the floor. The shower drain line DR (or in the case of point drainages the drain or the pipe) is hereby first glued over with a sealing sheet 310, with care being taken that no abutment of sheets is present above the drain line. Then the drain opening is cut out flush inside with a knife. Due to the adhesive layer 314 on the wall-facing side the sealing sheet 310 adheres sealingly on the horizontal flange of the (typically metallic) shower drain line DR.

Figure 7:
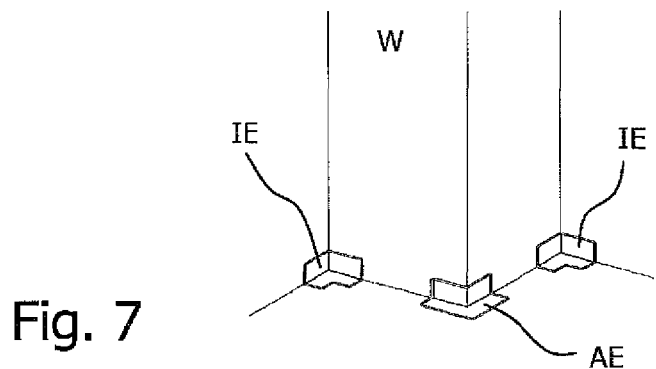
FIG. 7 the arrangement of rectangular inner corners and outer corners in a room.

FIG. 7 shows two rectangular inner corners IE and an outer corner AE, which are made of the material of an adhesive strip and are pre-shaped in a corresponding three-dimensional shape. This three-dimensional shape can for example be realized by deep drawing. The inner corners IE are delimited by rectangular corners.

Figure 8:
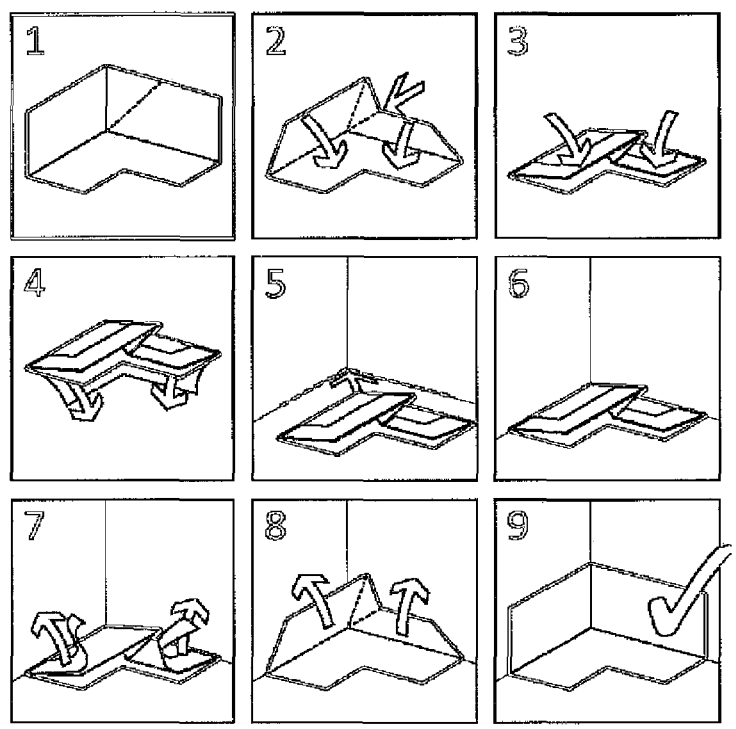
FIG. 8 the arrangement of a rectangular inner corner.

FIG. 8 exemplarily illustrates in nine steps the arrangement of a rectangular inner corner. Hereby the pre-shaped inner corner is first folded, then glued to a corner on the floor, raised and glued to the walls. As an alternative the inner corners or outer corners can also solely be made of a foamed plastic layer, i.e., they carry no adhesive and no non-woven.

Figure 9:
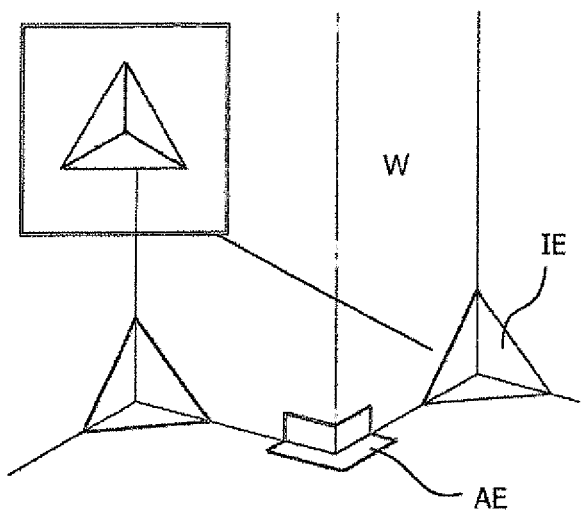
FIG. 9 the arrangement of pyramid-shaped inner corners and outer corners in a room.

FIG. 9 shows in contrast to FIG. 7 two inner corners IE in the shape of a pyramid with triangular base area.

Figure 10:
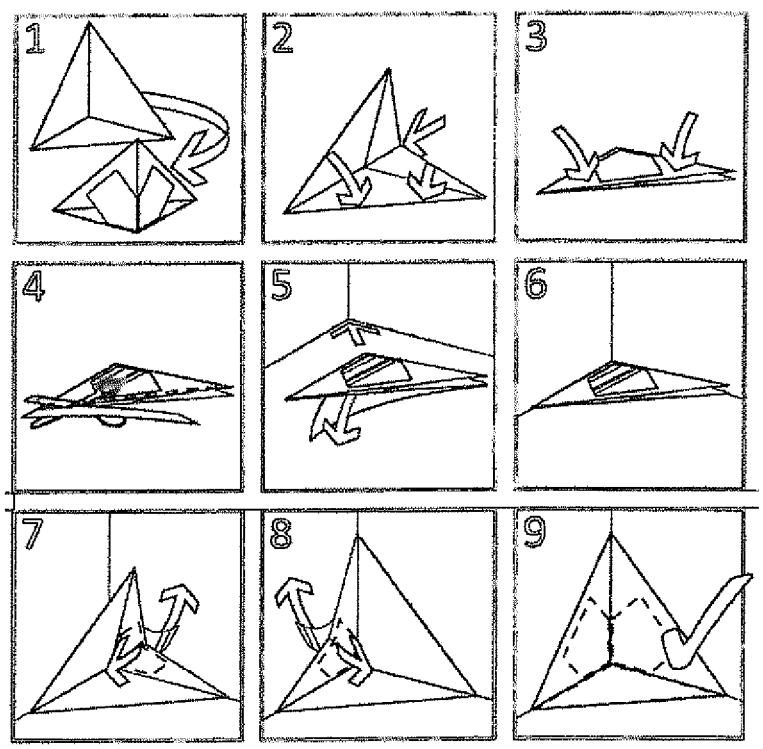
FIG. 10 the arrangement of a pyramid shaped inner corner.

FIG. 10 illustrates in this context exemplarily the arrangement of a pyramid-shaped inner corner. Hereby the pre-shaped inner corner is first bent and optionally shortened at the sides. After removal of the protective film the inner corner is glued in the floor corner, raised and glued to the walls.

In sum, according to an embodiment of the invention cellular foamed plastic is used as support material (made of polyolefin, polyethylene, polypropylene, polyurethane, silicone, cellular rubber, acrylic foam, butyl, etc.). The adhesive can for example be butyl, synthetic rubber, crosslinked or un-crosslinked acrylate, dispersion or the like. Adhesive bands or adhesive strips are formed as a combination of these support materials and the adhesive.

In addition an embodiment of the invention provides a combination of dry and wet gluing:

1. The cellular foam sheet is for this purpose provided with a non-woven structure over its entire surface area on its front side for anchoring the construction chemistry.

2. The back side (wall/floor) of the foam sheet is optionally provided centrally with a non-woven structure and has on its left and right side zones of between 20-100 mm width that are free of non-woven for a dry connection.

3. An adhesive strip free of non-woven is provided at edges (wall/wall, floor/floor) and for overlap at abutments of foam sheets. The adhesive strip is typically 50-200 mm wide and self-adhesive on both sides or adhesive on one side (in this case the non-woven-free side on the back side of the foam sheet has to be provided with a cover film on the right and left side).

4. The adhesive strips are glued to the wall/floor. The distance of the adhesive strips results from the width of the non-woven structure (backside of the foam sheet).

5. The interspace between the adhesive strips is filled with tile glue or other construction chemistry.

6. The sealing sheets are glued dry on the fight and left on the adhesive strips (overlap) and are centrally embedded in the construction chemistry.

7. The transition to the point or line drainage can be accomplished with a laminated foamed plastic membrane made of glue (floor/drain line)/foam/non-woven combination.

In addition also a pure wet gluing with a cellular foamed plastic system is possible, which includes the following components:
  sealing sheets
  adhesive strips (for edges)
  inner and outer corners.

Further a pure dry gluing with a cellular foamed plastic system is possible when the sealing sheets are provided over the entire surface on their wall-facing side with an adhesive layer.

The described system has the following advantages:

Foamed plastic: the foam cells compensate sharp edged, pointed support surfaces, the sealing effect is retained.

Closed-celled shape: negligible water uptake, very high resistance against water vapor diffusion Physical crosslinking: increased resistance against alkaline media common in construction, high temperature resistance.

Polyolefin foam: resistant against chemicals, does not promote mold formation, environmentally friendly.

High malleability: adjusts well to unevenesses.

High elasticity: compensates thermal dilation tensions, decouples the tile from the underground.

Relatively small dynamic stiffness: acoustic decoupling tile-underground.

Lightweight material: simple transport, simple positioning of large surface areas on construction site by a single person.

Butyl glue (thickness about 0.5-2.0 mm): self-adhesive on both sides and can be glued sealingly in the corner; due to the fact that butyl can be molded or welded the cutting edges can be closed in the case of an inner corner overlap.

What is claimed is:

1. A sealing sheet for arrangement between a wall and a wall covering, said sealing sheet comprising:
  a water impermeable carrier layer made of a closed-cell foamed plastic and having an elongation at break of over 300%;
  an adhesion mediating structure arranged on the water impermeable carrier layer on a room-facing side of the sealing sheet; and
  a further adhesion mediating structure provided on a wall-facing side of the sealing sheet and covering only a central part of the water impermeable carrier layer leaving both opposing end parts of the water impermeable carrier layer not covered by the further adhesive mediating structure,
  wherein said further adhesion mediating structure continuously covers 65% to 96% of said wall-facing side of said sealing sheet and is located on the central part of the water impermeable carrier layer between the opposing end parts.

2. The sealing sheet of claim 1, wherein the adhesion mediating structure is a non-woven.

3. The sealing sheet of claim 1, wherein the sealing sheet has an adhesive layer provided on a wall-facing side of the sealing sheet.

4. The sealing sheet of claim 3, wherein the adhesive layer is applied over an entire surface of the wall-facing side or is limited to at least one of the opposing end parts of the wall-facing side of the sealing sheet.

5. The sealing sheet of claim 1, wherein the foamed plastic is a closed-cell plastic and/or is physically cross linked; and/or contains at least one of polyolefin, polyethylene, polyurethane, silicone, cellular rubber, acrylic foam, and butyl; and/or has a elongation at break of over 300%; and for a thickness of less than about 5 mm.

6. The sealing sheet of claim 3, wherein the adhesive layer contains at least one of butyl, synthetic rubber, a crosslinked acrylate, an un-crosslinked acrylate and an adhesive dispersion.

7. The sealing sheet of claim 1, wherein the sealing sheet is configured as a sleeve for a shower drain line.

8. The sealing sheet of claim 5, wherein the foamed plastic has a thickness of less than about 1 mm.

9. The sealing sheet of claim 5, wherein the foamed plastic has a thickness of less than about 0.6 mm.

10. A sealing sheet for arrangement between a wall and a wall covering, said sealing sheet comprising:
  a water impermeable carrier layer made of a foamed plastic and having a thickness of less than 0.6 mm;
  an adhesion mediating structure arranged directly on the water impermeable carrier layer on a room-facing side of the sealing sheet, said adhesion mediating structure being constructed as a non-woven; and
  a further adhesion mediating structure provided on a wall-facing side of the sealing sheet and covering only a central part of the water impermeable carrier layer leaving both opposing end parts of the water impermeable carrier layer not covered by the further adhesive mediating structure,
  wherein said further adhesion mediating structure continuously covers 65% to 96% of said wall-Ewing side of said sealing sheet and is located on the central part of the water impermeable carrier layer between the opposing end parts.

11. A sealing kit for arrangement between a wall and a wall covering, said sealing kit comprising:
- an elongated sealing sheet including a water impermeable carrier layer made of a closed cell foamed plastic and having an elongation at break of over 300%, a first adhesion mediating structure arranged on the water impermeable carrier layer on a room-facing side of the sealing sheet and extending over a whole length of the sealing sheet, a second adhesion mediating structure arranged under the water impermeable carrier layer on a wall-facing side of the sealing sheet and extending only along a central part of the water impermeable carrier layer so that longitudinally spaced end parts of the water impermeable carrier layer are not covered by the second adhesion mediating structure; and
- an adhesive strip including a support layer provided with a first adhesive layer on its room-facing side and a second adhesive layer on its wall-facing side and placeable under one of the not covered longitudinally spaced end parts of the water impermeable carrier layer to connect the elongated sealing sheet to the wall,
- wherein the adhesive strip including the at least one support layer with the first and second adhesive layers has a length exceeding the length of the not covered longitudinally spaced end part of the water impermeable carrier layer so that it extends longitudinally outwardly beyond the water impermeable carrier layer for extending under a not covered longitudinally spaced end part of a water impermeable carrier layer of a neighboring sealing kit,
- wherein said second adhesion mediating structure continuously covers 65% to 96% of said wall-facing side of said sealing sheet and is located on the central part of the water impermeable carrier layer between the longitudinally spaced end parts.

12. The sealing kit of claim 11, wherein the first and second adhesion mediating structures are non-woven.

13. The sealing kit of claim 11, wherein the sealing sheet has an adhesive layer provided on a wall-facing side of the sealing sheet.

14. The sealing kit of claim 13, wherein the adhesive layer is applied over an entire surface of the wall-facing side of the sealing sheet or is limited to at least one of the opposing end parts of the wall-facing side of the sealing sheet.

15. The sealing kit of claim 11, wherein an adhesive layer is arranged on a room-facing side of the adhesive strip.

16. The sealing kit of claim 11, wherein the foamed plastic is a closed-cell plastic and/or is physically crosslinked, and/or contains at least one of polyolefin, polyethylene, polyurethane, silicone, cellular rubber, acrylic foam, and butyl, and/or has a elongation at break of over 300%, and/or a thickness of less than about 5 mm.

17. The sealing kit of claim 15, wherein the adhesive layer contains at least one of butyl, synthetic rubber, a crosslinked acrylate, an un-crosslinked acrylate and an adhesive dispersion.

18. The sealing kit of claim 11, wherein the adhesive strip is three-dimensionally shaped as an inner corner or as an outer corner.

19. A watertight wall closure, comprising:
- a wall;
- an elongated sealing sheet including a water impermeable carrier layer made of a closed cell foamed plastic and having an elongation at break of over 300%, a first adhesion mediating structure arranged on the water impermeable carrier layer on a room-facing side of the sealing sheet and extending over a whole length of the sealing sheet, a second adhesion mediating structure arranged under the water impermeable carrier layer on a wall-facing side of the sealing sheet and extending only along a central part of the water impermeable carrier layer so that longitudinally spaced end parts of the water impermeable carrier layer are not covered by the second adhesion mediating structure;
- an adhesive strip including a support layer provided with a first adhesive layer on its room-facing side and a second adhesive layer on its wall-facing side and placeable under one of the not covered longitudinally spaced end parts of the water impermeable carrier layer to connect the elongated sealing sheet to the wall, wherein the adhesive strip including the at least one support layer with the first and second adhesive layers has a length exceeding the length of the not covered longitudinally spaced end part of the water impermeable carrier layer so that it extends longitudinally outwardly beyond the water impermeable carrier layer for extending under a not covered longitudinally spaced end part of a water impermeable carrier layer of a neighboring sealing kit; and
- a wall covering arranged by means of a tile glue on the adhesion mediating structure,
- wherein said second adhesion mediating structure continuously covers 65% to 96% of said wall-facing side of said sealing sheet and is located in the central part of the water impermeable carrier layer between the longitudinally spaced end parts.

20. The watertight wall closure of claim 19, wherein the first and second adhesion mediating structures are non-woven.

* * * * *